(12) United States Patent
Kosugi

(10) Patent No.: US 11,435,833 B2
(45) Date of Patent: Sep. 6, 2022

(54) ELECTRONIC APPARATUS AND CONTROL METHOD

(71) Applicant: Lenovo (Singapore) Pte. Ltd., Singapore (SG)

(72) Inventor: Kazuhiro Kosugi, Kanagawa (JP)

(73) Assignee: Lenovo (Singapore) Pte. Ltd., Singapore (SG)

( * ) Notice: Subject to any disclaimer, the term of this patent is extended or adjusted under 35 U.S.C. 154(b) by 0 days.

(21) Appl. No.: 17/237,570

(22) Filed: Apr. 22, 2021

(65) Prior Publication Data

US 2021/0397265 A1 Dec. 23, 2021

(30) Foreign Application Priority Data

Jun. 22, 2020 (JP) .............................. JP2020-107007

(51) Int. Cl.
*G06F 3/01* (2006.01)
*G06F 1/3231* (2019.01)
*G06F 1/3296* (2019.01)

(52) U.S. Cl.
CPC ............ *G06F 3/017* (2013.01); *G06F 1/3231* (2013.01); *G06F 1/3296* (2013.01); *G06F 3/011* (2013.01)

(58) Field of Classification Search
CPC ......... G06F 3/017; G06F 1/3231; G06F 3/011
See application file for complete search history.

(56) References Cited

U.S. PATENT DOCUMENTS

2013/0050425 A1* 2/2013 Im .................... G06F 3/017
  348/46
2020/0104581 A1* 4/2020 Lee .................... G06V 40/20

FOREIGN PATENT DOCUMENTS

| JP | 2003-255922 A | 9/2003 |
| JP | 2013-115649 A | 6/2013 |
| JP | 2016-062148 A | 4/2016 |
| JP | 2016-086334 A | 5/2016 |
| WO | 2018/173792 A1 | 9/2018 |
| WO | 2019/239566 A1 | 12/2019 |

* cited by examiner

*Primary Examiner* — Mark Edwards
*Assistant Examiner* — Chayce R Bibbee
(74) *Attorney, Agent, or Firm* — Osha Bergman Watanabe & Burton LLP

(57) ABSTRACT

An electronic apparatus includes: a detection sensor which detects a wave motion coming from an object present within a predetermined range and outputs a detection signal; an object detection unit which detects an object present within the predetermined range based on the detection signal output from the detection sensor; a gesture detection unit which detects a gesture according to the movement of the object based on the detection signal output from the detection sensor; and a detection resolution control unit which sets the detection resolution of the detection sensor to a first resolution when detecting the object present within the predetermined range, and sets the detection resolution of the detection sensor to a second resolution higher in resolution than the first resolution when detecting the gesture.

9 Claims, 12 Drawing Sheets

| 3 | 2 | 1 | 0 |
|---|---|---|---|
| 7 | 6 | 5 | 4 |
| 11 | 10 | 9 | 8 |
| 15 | 14 | 13 | 12 |

| 7 | 6 | 5 | 4 | 3 | 2 | 1 | 0 |
|---|---|---|---|---|---|---|---|
| 15 | 14 | 13 | 12 | 11 | 10 | 9 | 8 |
| 23 | 22 | 21 | 20 | 19 | 18 | 17 | 16 |
| 31 | 30 | 29 | 28 | 27 | 26 | 25 | 24 |
| 39 | 38 | 37 | 36 | 35 | 34 | 33 | 32 |
| 47 | 46 | 45 | 44 | 43 | 42 | 41 | 40 |
| 55 | 54 | 53 | 52 | 51 | 50 | 49 | 48 |
| 63 | 62 | 61 | 60 | 59 | 58 | 57 | 56 |

FIG. 8

ELECTRONIC APPARATUS AND CONTROL METHOD

FIELD OF THE INVENTION

The present invention relates to an electronic apparatus and a control method.

BACKGROUND OF THE INVENTION

There is an electronic apparatus such as a PC (Personal Computer) which controls operation by detecting whether or not a person is present in front thereof. For example, Japanese Unexamined Patent Application Publication No. 2003-255922 discloses a terminal processing device which displays an operation screen in response to detecting an approaching person.

On the other hand, there is an input method using a gesture as one of user interfaces on the PC. For example, when a user moves his/her hand from left to right or right to left toward the PC, the PC can perform control according to the gesture (for example, to turn up/down the volume, or the like). To detect a gesture, there is a method of detecting the movement of a user's hand using the same sensor as that used to detect a person.

However, low-resolution detection is enough only to detect a person, but high-resolution detection is required to detect a gesture and power consumption also increases.

SUMMARY OF THE INVENTION

One or more embodiments of the present invention provide an electronic apparatus and a control method capable of enabling detection of a gesture in addition to detection of a person while suppressing power consumption.

An electronic apparatus according to the first aspect of the present invention includes: a detection sensor that detects a wave motion coming from an object present within a predetermined range and outputs a detection signal; an object detection unit which detects an object present within the predetermined range based on the detection signal output from the detection sensor; a gesture detection unit which detects a gesture according to the movement of the object based on the detection signal output from the detection sensor; and a detection resolution control unit which sets the detection resolution of the detection sensor to a first resolution when detecting the object present within the predetermined range, and sets the detection resolution of the detection sensor to a second resolution higher in resolution than the first resolution when detecting the gesture.

In the above electronic apparatus, when the object detection unit detects a first object within the predetermined range and detects a second object at a distance closer than the first object, the detection resolution control unit may change the detection resolution from the first resolution to the second resolution.

In the above electronic apparatus, when the second object is further detected at a distance closer than the first object in a state where the first object is being detected within the predetermined range by the object detection unit, the detection resolution control unit may change the detection resolution from the first resolution to the second resolution.

In the above electronic apparatus, the detection resolution control unit may change the detection resolution from the first resolution to the second resolution when a first object is detected from a state where the first object is not detected within the predetermined range by the object detection unit, and after the change, continue the setting of the second resolution when a second object is detected at a distance closer than the first object within a predetermined period, or return from the second resolution to the first resolution when the second object is not detected at the distance closer than the first object within the predetermined period.

In the above electronic apparatus, the detection resolution control unit may return the detection resolution from the second resolution to the first resolution based on the fact that the second object is no longer detected from a state where the second object is being detected at the distance closer than the first object by the object detection unit.

In the above electronic apparatus, the gesture detection unit may detect a gesture according to the movement of the second object, and the detection resolution control unit may return the detection resolution from the second resolution to the first resolution based on the fact that the gesture according to the movement of the second object is detected by the gesture detection unit.

In the above electronic apparatus, the detection resolution control unit may change the detection resolution from the first resolution to the second resolution when the second object is detected at a distance closer by a fixed distance or more than the first object.

The above electronic apparatus may further include: a first chassis with the detection sensor provided therein; a second chassis connected to the first chassis in a manner to be rotatable relative to the first chassis, and on which an operation unit for accepting user's operations is provided; and an angle detection unit which detects an open angle between the first chassis and the second chassis, wherein when the open angle detected by the angle detection unit is less than a predetermined value, the object detection unit excludes a partial range in the predetermined range from a detection target.

A control method according to the second aspect of the present invention is a control method for an electronic apparatus including a detection sensor which detects a wave motion coming from an object present within a predetermined range and outputs a detection signal, the control method including: a step of causing an object detection unit to detect an object present within the predetermined range based on the detection signal output from the detection sensor; a step of causing a gesture detection unit to detect a gesture according to the movement of the object based on the detection signal output from the detection sensor; and a step of causing a detection resolution control unit to set the detection resolution of the detection sensor to a first resolution when detecting the object present within the predetermined range, and set the detection resolution of the detection sensor to a second resolution higher in resolution than the first resolution when detecting the gesture.

The above-described aspects of the present invention enable detection of a gesture in addition to detection of a person while suppressing power consumption.

BRIEF DESCRIPTION OF THE DRAWINGS

FIGS. 2(A)-(B) are diagrams illustrating two kinds of operating modes of a proximity sensor according to the first embodiment.

FIG. 8 is a schematic diagram illustrating an example of detection states of the proximity sensor at the time of gesture detection according to the first embodiment.

DETAILED DESCRIPTION OF THE INVENTION

First Embodiment

First, the outline of an electronic apparatus 1 according to a first embodiment of the present invention will be described with reference to the accompanying drawings. The electronic apparatus 1 according to the present embodiment is, for example, an information processing apparatus such as a laptop PC (Personal Computer). Note that the electronic apparatus 1 may also be an information processing apparatus of any other type, such as a desktop PC, a tablet terminal, or a smartphone.

The electronic apparatus 1 can make a transition at least between a normal operating state (power-on state) and a standby state as system operating states. The normal operating state is an operating state capable of executing processing without being particularly limited, which corresponds, for example, to S0 state defined in the ACPI (Advanced Configuration and Power Interface) specification. The standby state is a state in which at least part of system processing is limited. For example, the standby state is a state in which at least the display of a display unit appears to be OFF, i.e., an operating state lower in power consumption than the normal operating state. The standby state may be the standby state or a sleep state, or a state corresponding to Modern Standby in Windows (registered trademark) or S3 state (sleep state) defined in the ACPI specification.

In the following, a transition of the system operating state from the standby state to the normal operating state may be called "boot." In the standby state, since the activation level is generally lower than the normal operating state, the boot of the system of the electronic apparatus 1 to start system processing leads to the activation of the operation of the system processing in the electronic apparatus 1.

Figure 1:
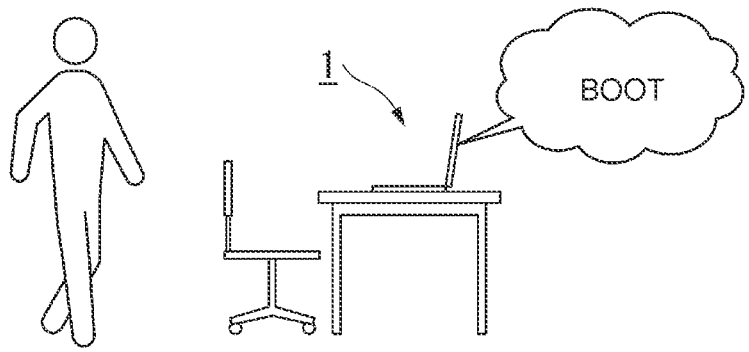
FIGS. 1(A)-(C) are diagrams for describing the outline of an electronic apparatus according to a first embodiment.
Figure 1:
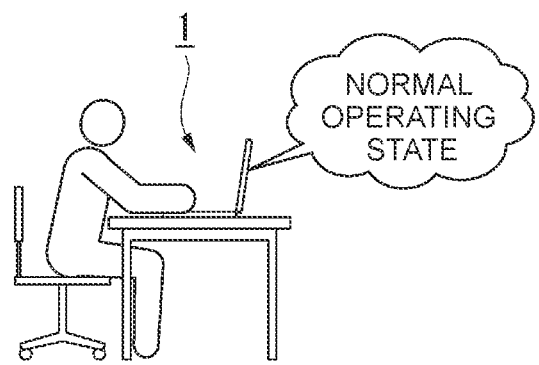
Figure 1:
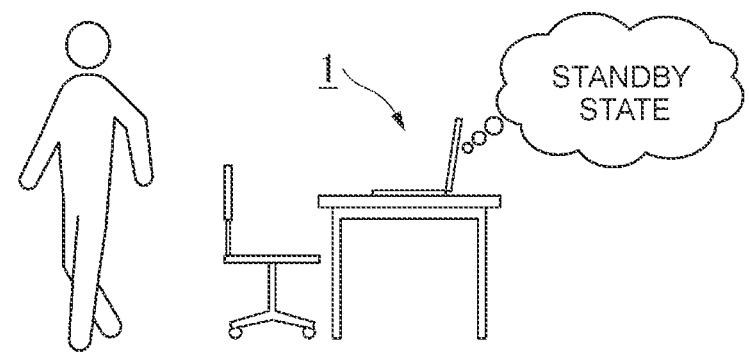

FIGS. 1(A)-(C) are diagrams for describing the outline of the electronic apparatus 1 according to the present embodiment. The electronic apparatus 1 includes a proximity sensor to be described later to detect a person present in the neighborhood of the electronic apparatus 1. This processing for detecting the presence of a person may also be called HPD (Human Presence Detection) processing. The electronic apparatus 1 detects a person present in the neighborhood of the electronic apparatus 1 to control the operating state of the electronic apparatus 1 based on the detection result. For example, as illustrated in FIG. 1(A), when detecting a change from a state where no person is present in front of the electronic apparatus 1 (Absence) to a state where a person is present (Presence), that is, when detecting that a person approaches the electronic apparatus 1 (Approach), the electronic apparatus 1 automatically boots the system to make a transition to the normal operating state. Further, in a state where a person is present in front of the electronic apparatus 1 (Presence) as illustrated in FIG. 1(B), the electronic apparatus 1 imposes such a restriction on the system so as not to make a transition to the standby state and to continue the normal operating state. Then, as illustrated in FIG. 1(C), when detecting a change from a state where a person is present in front of the electronic apparatus 1 (Presence) to a state where no person is present (Absence), that is, when detecting that the person has left the electronic apparatus 1 (Leave), the electronic apparatus 1 causes the system to make the transition to the standby state. In the following, a detection mode for detecting the approach of a person may also be called an "approach detection mode," and a detection mode for detecting the leave of the person may also be called a "leave detection mode."

The electronic apparatus 1 also supports input using a gesture as a user interface. The electronic apparatus 1 detects gestures of a person using the proximity sensor used for HPD. As the gestures, for example, moving a hand from up to down (or from down to up), moving a hand from left to right (or from right to left), drawing a circle with a hand, putting a hand forward and making it remain stationary, and the like can be exemplified. For example, when detecting such a gesture as to move a hand from up to down (or from down to up), the electronic apparatus 1 executes control to turn down or turn up the volume. Further, when detecting such a gesture as to move a hand from left to right (or from right to left), the electronic apparatus 1 may execute control to turn or return a page in processing of a presentation application program, or may execute control to play the next music or play the previous music in processing of a music player application. Each combination of the kind of gesture and control to be executed can be determined by the specifications of the OS (Operating System) and the application program.

The proximity sensor used for detection detects a wave motion coming from an object present within a predetermined range to output a detection signal. For example, the proximity sensor is an infrared distance sensor configured to include a light-emitting part for emitting infrared light and a light-receiving part for receiving reflected light which is the infrared light returned after being emitted and reflected on the surface of the object. The proximity sensor detects, with a predetermined sampling frequency (for example, 1 Hz), light received by the light-receiving part, and outputs a detection signal according to the distance to the object (for example, a person, (more specifically, the body of the person, a hand in the body, or the like)) by using a ToF (Time of Flight) method for converting, to a distance, a time difference from light-emitting to light-receiving. This proximity sensor has two kinds of operating modes different in detection resolution.

FIGS. 2(A)-(B) are diagrams illustrating two kinds of operating modes different in the detection resolution of the proximity sensor. FIG. 2(A) illustrates the number of detection elements (for example, 4×4) in an operating mode for low-resolution detection (hereinafter called a "low-resolution mode"). On the other hand, FIG. 2(B) illustrates the number of detection elements (for example, 8×8) in an operating mode for high-resolution detection (hereinafter called a "high-resolution mode"). In the low-resolution mode, since detection elements (for example, 4×4) obtained by thinning out the detection elements (for example, 8×8) equipped in the proximity sensor is used, there is an advantage of low power consumption. When the presence or absence of a person is detected, the low-resolution mode is enough, but when a gesture is detected, the low-resolution mode runs out of resolution because there is a need to determine the movement of a hand. On the other hand, since the high-resolution mode uses detection elements (for example, 8×8) larger in number than the low-resolution mode, it is possible to detect a gesture, but power consumption is high. When the high-resolution mode is always set, both the detection of a person and the detection of a gesture are possible, but power consumption remains always high. Therefore, the low-resolution mode is set in the electronic apparatus 1 by default, and changed to the high-resolution mode only when needed.

In the present embodiment, the description is made by using the example in which a total of 64 detection elements composed of 8 detection elements in the horizontal direction×8 detection elements in the vertical direction are arranged in a proximity sensor 130, but the present invention is not limited thereto. The number of arranged detection elements can be any number. Further, the number and arrangement of detection elements in the low-resolution mode are also not limited to 4×4. The number of detection elements in the low-resolution mode just has to be smaller than the number of detection elements in the high-resolution mode.

Figure 3:
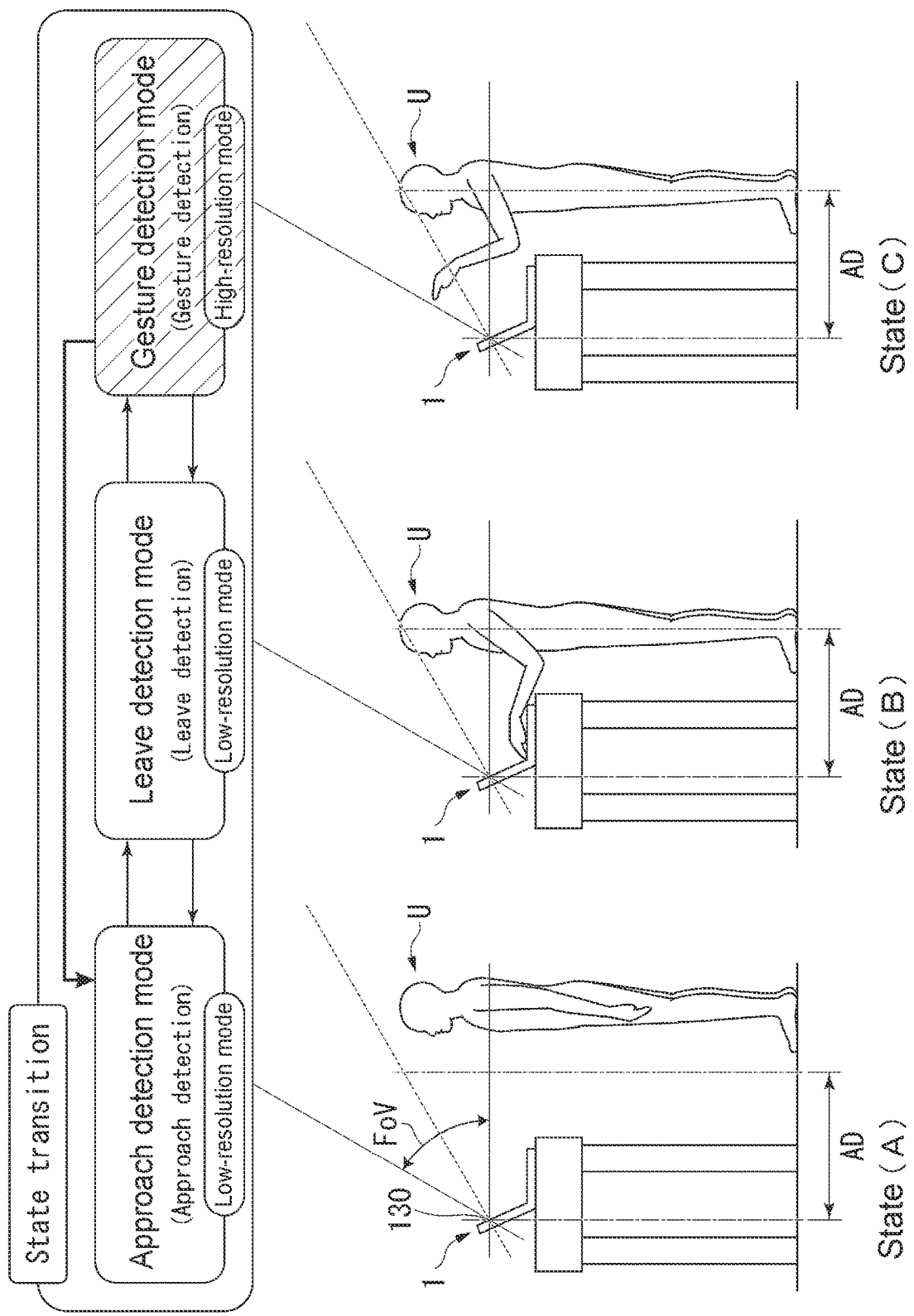
FIG. 3 is a diagram illustrating state transitions between detection modes according to the first embodiment.

FIG. 3 is a diagram illustrating state transitions between detection modes according to the present embodiment. The proximity sensor 130 included in the electronic apparatus 1 detects an object (for example, a person) within a person detection range defined by a detection field of view FoV and a detection distance. When a person enters from the outside to the inside of an approach detection distance AD to the electronic apparatus 1 within the detection field of view FoV, the electronic apparatus 1 detects that the person has approached. The electronic apparatus 1 makes a transition to each of states (A), (B), and (C) depending on the detection state of the person.

State (A) is such a state that a person U is present farther away from the electronic apparatus 1 than the approach detection distance AD. The electronic apparatus 1 determines such a state that no person is present (Absence), and is in the approach detection mode for detecting the approach of a person in the low-resolution mode. Then, when the person U moves closer to the electronic apparatus 1 than the approach detection distance AD, the electronic apparatus 1 makes a transition to the leave detection mode of state (B). Note that no gesture input is performed in the approach detection mode because no person is present.

State (B) is such a state that the person U is present closer to the electronic apparatus 1 than the approach detection distance AD. The electronic apparatus 1 determines such a state that a person is present (Presence), and is in the leave detection mode for detecting the leave of the person in the low-resolution mode. Since the person is present in the leave detection mode, there is a possibility to perform gesture input. Therefore, the electronic apparatus 1 monitors whether the person U puts his/her hand forward or not. When detecting that the person U puts his/her hand forward, the electronic apparatus 1 makes a transition to a gesture detection mode of state (C). Note that when the person U gets farther away from the electronic apparatus 1 than the approach detection distance AD, the electronic apparatus 1 returns to the approach detection mode of state (A).

State (C) is such a state that the person U is present closer to the electronic apparatus 1 than the approach detection distance AD and the person U is putting his/her hand forward. The electronic apparatus 1 is in the gesture detection mode for detecting a gesture of the person U in the high-resolution mode. When the detection of a gesture is completed or the hand of the person U is no longer detected, the electronic apparatus 1 returns to the leave detection mode of state (B). Further, when the person U is no longer detected in the gesture detection mode of state (C), the electronic apparatus 1 returns to the approach detection mode of state (A).

Thus, in the leave detection mode as the state where a person is present (Presence), when the person puts his/her hand forward toward the electronic apparatus 1, the electronic apparatus 1 detects the hand and changes the proximity sensor 130 automatically from the low-resolution mode to the high-resolution mode. Further, when the detection of the gesture is completed or the hand of the person is no longer detected, the electronic apparatus 1 changes the proximity sensor 130 automatically from the high-resolution mode to the low-resolution mode. Thus, since the high-resolution mode is set only when the detection of a gesture is performed, the electronic apparatus 1 can detect a gesture in addition to the detection of a person while suppressing power consumption.

Figure 4:
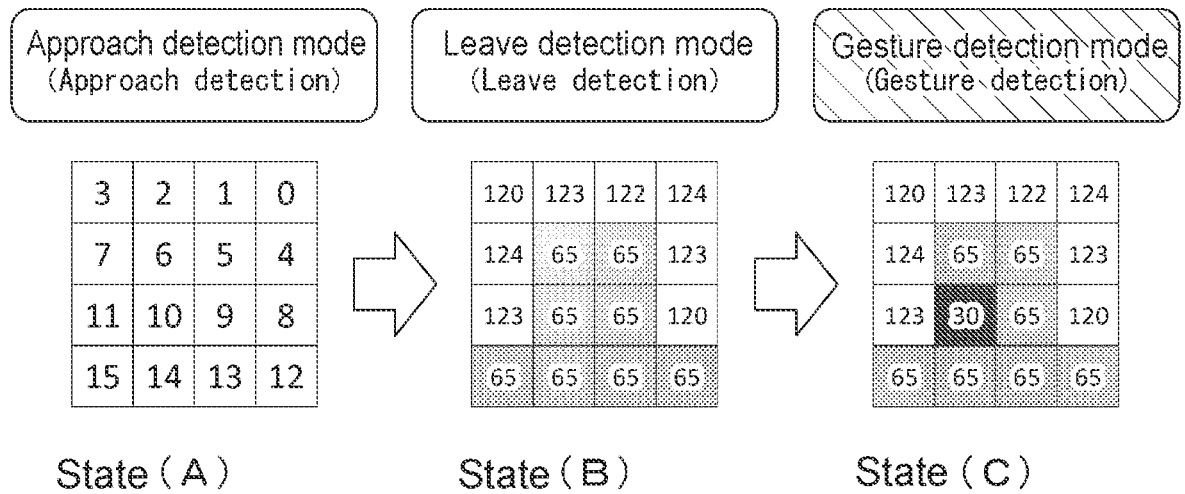
FIG. 4 is a schematic diagram illustrating detection states of the proximity sensor according to the first embodiment.

Next, a detection method for detecting that a person puts his/her hand forward in the leave detection mode will be described. FIG. 4 is a schematic diagram illustrating detection states of the proximity sensor 130. State (A) is such a state that no person is present (Absence), which is the approach detection mode. The proximity sensor 130 is in the low-resolution mode. In this state (A), each of 4×4 squares corresponding to 4×4 detection elements is numbered, and no object (person) is detected in all squares within the approach detection distance AD. State (B) is such a state that a person is present (Presence), which is the leave detection mode. The number of each square represents distance to the detected object (the body of the person). The detection distance in a total of 8 squares with square numbers 5, 6, 9, 10, and 12 to 15 is 65 cm, indicating the squares in which the body of the person is detected. State (C) is such a state that the person is putting his/her hand forward, which is the gesture detection mode. Although the detection distance in the total of 8 squares with square numbers 5, 6, 9, 10, and 12 to 15 is 65 cm in the state (B), the detection distance is 30 cm only in the square 10 in the state (C). This square 10 is a square in which the hand of the person is being detected.

Figure 5:
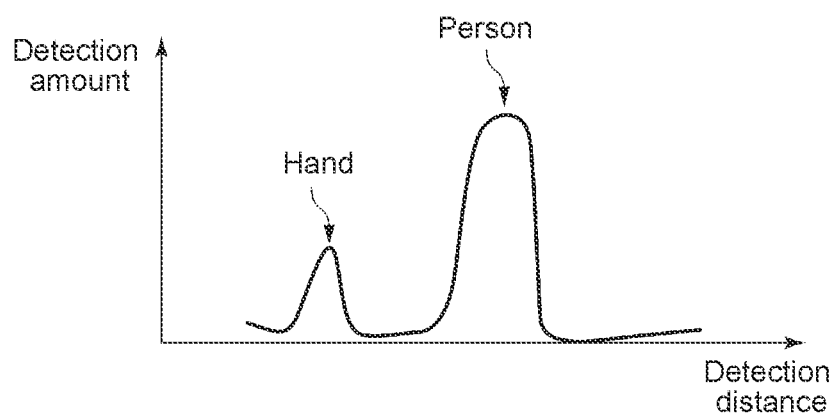
FIG. 5 is a graph illustrating an example of a detection signal in a state where a person is putting his/her hand forward according to the first embodiment.

FIG. 5 is a graph illustrating an example of a detection signal in the state where the person is putting his/her hand forward as illustrated in state (C) of FIG. 4. The detection signal corresponds to a detection signal output from the proximity sensor 130. In FIG. 5, the abscissa represents detection distance to the electronic apparatus 1 (proximity sensor 130), and the ordinate represents detection amount. As illustrated in FIG. 5, peaks appear at two points, one point corresponding to 65 cm at which the body of the person is detected, and the other point corresponding to 30 cm at which the hand is detected. In other words, it can be detected that the person is putting his/her hand forward on condition that a second peak appears at a distance shorter than a first peak corresponding to 65 cm at which the body of the person is detected.

Note that it does not matter that the first peak and the second peak are close in distance to each other as long as the number of peaks can be determined to be two, but it may also be detected that the person is putting his/her hand forward on condition that the peaks are separated from each other by a fixed distance or more (for example, about 15 cm to 20 cm). For example, the condition that the peaks are separated from each other by the fixed distance or more can prevent a shoulder of the person from being misidentified as a hand when the shoulder of the person goes forward a little.

(External Structure of Electronic Apparatus)

Figure 6:
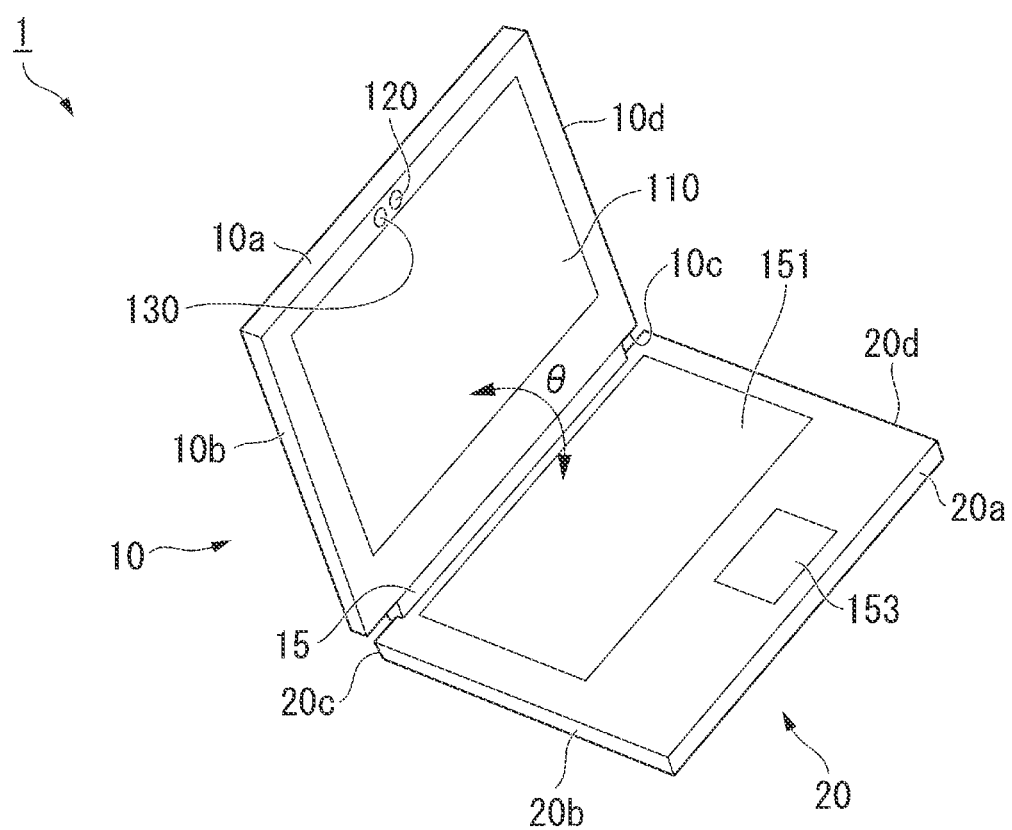
FIG. 6 is a perspective view illustrating an external structure example of the electronic apparatus according to the first embodiment.

FIG. 6 is a perspective view illustrating an external structure example of the electronic apparatus 1 according to the present embodiment.

The electronic apparatus 1 includes a first chassis 10, a second chassis 20, and a hinge mechanism 15. The first chassis 10 and the second chassis 20 are coupled by using the hinge mechanism 15. The first chassis 10 is rotatable around an axis of rotation formed by the hinge mechanism 15 relative to the second chassis 20. The direction of the axis of rotation is parallel to side faces 10c and 20c on which the hinge mechanism 15 is placed.

The first chassis 10 is also called A cover or a display chassis. The second chassis 20 is also called C cover or a system chassis. In the following description, the side faces on which the hinge mechanism 15 is provided among side faces of the first chassis 10 and the second chassis 20 are referred to as the side faces 10c and 20c, respectively. Among the side faces of the first chassis 10 and the second chassis 20, side faces opposite to the side faces 10c and 20c are referred to as side faces 10a and 20a, respectively. In this figure, the direction from the side face 20a toward the side face 20c is referred to as "rear," the direction from the side face 20c to the side face 20a is referred to as "front." The right hand and left hand in the rearward direction are referred to as "right" and "left," respectively. Left side faces of the first chassis 10 and the second chassis 20 are referred to as side faces 10b and 20b, respectively, and right side faces thereof are referred to as side faces 10d and 20d, respectively. Further, a state where the first chassis 10 and the second chassis 20 overlap each other and are completely closed (a state of open angle θ=0°) is referred to as a "closed state." The faces of the first chassis 10 and the second chassis 20 on the face-to-face sides in the closed state are referred to as respective "inner faces," and the faces opposite to the inner faces are referred to as "outer faces." Further, a state opposite to the closed state, where the first chassis 10 and the second chassis 20 are open, is referred to as an "open state."

The external appearance of the electronic apparatus 1 in FIG. 6 illustrates an example of the open state. The open state is a state where the side face 10a of the first chassis 10 and the side face 20a of the second chassis 20 are separated from each other. In the open state, the inner faces of the first chassis 10 and the second chassis 20 appear so that the electronic apparatus 1 is expected to be able to carry out normal operation. The open state is a state where the open angle θ between the inner face of the first chassis 10 and the inner face of the second chassis 20 is equal to or more than a predetermined angle (for example, 20°) or more, which is about 100 to 130° in a typical usage form. Note that the range of open angles θ to be the open state can be set arbitrarily according to the range of angles rotatable by the hinge mechanism 15, and the like.

A display unit 110 is provided on the inner face of the first chassis 10. The display unit 110 is configured to include a liquid crystal display (LCD) or an organic EL (Electro Luminescence) display, and the like. Further, an imaging unit 120 and the proximity sensor 130 are provided in a peripheral area of the display unit 110 on the inner face of the first chassis 10. In other words, the imaging unit 120 and the proximity sensor 130 are provided in positions to face a person (user) who uses the electronic apparatus 1. The imaging unit 120 and the proximity sensor 130 are placed side by side on the side of the side face 10a in the peripheral area of the display unit 110. Note, however, that the imaging unit 120 or the proximity sensor 130 may be placed on the side of the side face 10b, the side face 10c, or the side face 10d in the peripheral area of the display unit 110.

The imaging unit 120 captures an image of an object within a predetermined angle of view in a direction (frontward) to face the inner face of the first chassis 10 in the open state. The predetermined angle of view is an imaging angle of view defined by an image sensor included in the imaging unit 120 and an optical lens provided in front of an imaging surface of the image sensor.

The proximity sensor 130 detects an object (for example, a person (more specifically, the body of a person, a hand in the body, or the like)) present in the neighborhood of the electronic apparatus 1. For example, the proximity sensor 130 is an infrared (IR) sensor configured to include a light-emitting element for emitting IR light and a plurality of detection elements for detecting reflected light which is the IR light returned after being emitted and reflected on the surface of the object (i.e., the IR light coming from the object). Note that the light-emitting element for emitting the IR light may be incorporated inside the proximity sensor 130 at a position different from the position of the detection elements (such a position that the emitted IR light does not come directly to the detection elements), or may be provided at a position different from the position of the proximity sensor 130 on the inner face of the first chassis 10.

As described with reference to FIGS. 2(A)-(B), the proximity sensor 130 can switch between the low-resolution mode and the high-resolution mode. In the high-resolution mode, the proximity sensor 130 uses, for example, the 8×8 detection elements, while in the low-resolution mode, the proximity sensor 130 uses, for example, the 4×4 detection elements obtained by thinning out the 8×8 detection elements. The power consumption in the low-resolution mode is lower than that in the high-resolution mode. The proximity sensor 130 samples a luminous intensity detected by each of the detection elements in every predetermined sampling cycle (for example, 50 to 200 ms) and outputs a detection signal according to the sampled luminous intensity (that is, a detection signal indicative of the detection amount according to the distance to an object (see FIG. 5)).

A keyboard 151 and a touch pad 153 are provided as an input device on the inner face of the second chassis 20. Note that the input device may also include a touch sensor panel for detecting a touch operation in an area corresponding to a display surface of the display unit 110, or a mouse and an external keyboard may be connected. The input device may further include a microphone used to input voice.

In the closed state where the first chassis 10 and the second chassis 20 are closed, the display unit 110, the imaging unit 120, and the proximity sensor 130 provided on the inner face of the first chassis 10 are covered with the inner face of the second chassis 20, and put in a state of being disabled from fulfilling the functions thereof. In the state where the first chassis 10 and the second chassis 20 are completely closed, the open angle θ is 0°.

(Configuration of Electronic Apparatus)

Figure 7:
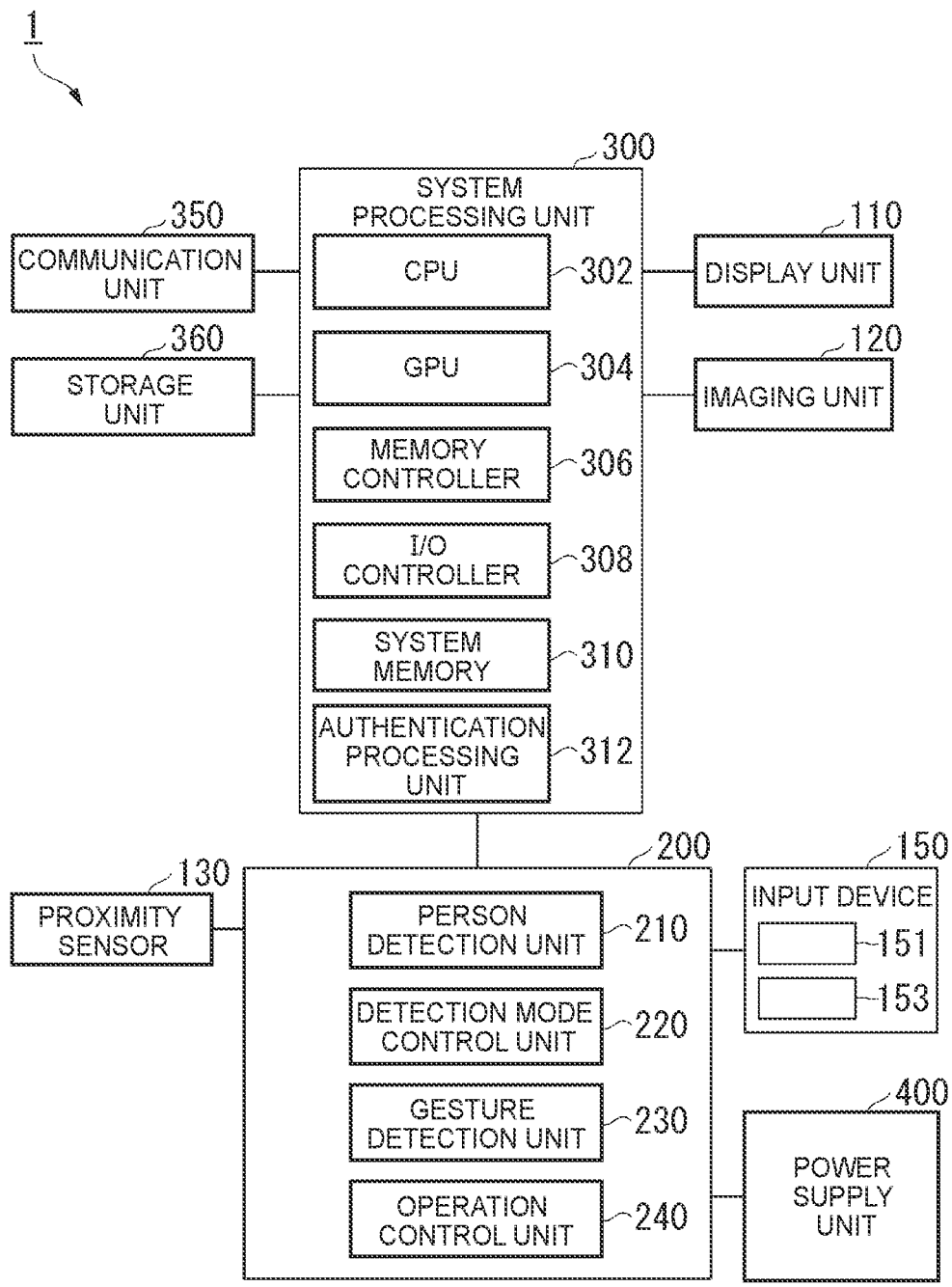
FIG. 7 is a schematic block diagram illustrating an example of the configuration of the electronic apparatus according to the first embodiment.

FIG. 7 is a schematic block diagram illustrating an example of the configuration of the electronic apparatus 1 according to the present embodiment. The electronic apparatus 1 is configured to include the display unit 110, the imaging unit 120, the proximity sensor 130 (an example of a detection sensor), an input device 150, an EC (Embedded Controller) 200, a system processing unit 300, a communication unit 350, a storage unit 360, and a power supply unit 400. The display unit 110 displays display data generated in system processing executed by the system processing unit 300.

The imaging unit 120 captures an image of an object within a predetermined angle of view in a direction (frontward) to face the inner face of the first chassis 10, and outputs the captured image to the system processing unit 300. For example, when the face of a person approaching the electronic apparatus 1 is contained within the angle of view of the imaging unit 120, the imaging unit 120 captures an image of the face of the person, and outputs the captured face image to the system processing unit 300. The imaging unit 120 may be an infrared camera or may be a normal camera. The infrared camera is a camera including an infrared sensor as an image sensor. The normal camera is a camera including, as the image sensor, a visible light sensor for receiving a visible light beam.

The proximity sensor 130 detects an object (for example, a person (more specifically, the body of a person, a hand in the body, or the like)) present in the front direction (forward) of the first chassis 10, and outputs, to the EC 200, a detection signal indicative of the detection result.

The input device 150 is an input unit for accepting user's input, which is configured to include, for example, the keyboard 151 and the touch pad 153. In response to accepting operations on the keyboard 151 and the touch pad 153, the input device 150 outputs, to the EC 200, operation signals indicative of the content of the operations.

The power supply unit 400 supplies power through a power system to each unit of the electronic apparatus 1 according to the operating state of each unit. The power supply unit 400 includes a DC (Direct Current)/DC converter. The DC/DC converter converts the voltage of DC power, supplied from an AC (Alternate Current)/DC adapter or a battery pack, to a voltage required for each unit. The power with the voltage converted by the DC/DC converter is supplied to each unit through each power system. For example, the power supply unit 400 supplies power to each unit through each power system based on a control signal input from the EC 200 according to the operating state of each unit.

The EC 200 is a microcomputer configured to include a CPU, a RAM (Random Access Memory), a ROM (Read Only Memory), an I/O (Input/Output) logic circuit, and the like. The CPU of the EC 200 reads a control program prestored in the ROM thereof and executes the read control program to fulfill the function. The EC 200 operates independently of the system processing unit 300 to control the operation of the system processing unit 300 and manage the operating state of the system processing unit 300. The EC 200 is connected to the proximity sensor 130, the input device 150, and the power supply unit 400.

For example, the EC 200 acquires the detection signal indicative of the detection result from the proximity sensor 130, and executes HPD processing for detecting the presence of a person based on the detection result and gesture detection processing for detecting a hand of the person to detect a gesture. The EC 200 also controls the operating state of the system processing unit 300 according to the HPD processing. Further, the EC 200 communicates with the power supply unit 400 to acquire information on a battery state (remaining battery capacity, and the like) from the power supply unit 400, and to output, to the power supply unit 400, a control signal or the like in order to control the supply of power according to the operating state of each unit of the electronic apparatus 1. Further, the EC 200 acquires operation signals from the input device 150, and outputs, to the system processing unit 300, an operation signal related to processing of the system processing unit 300 among the acquired operation signals.

For example, as a functional configuration related to the HPD processing and the gesture detection processing, the EC 200 includes a person detection unit 210 (an example of an object detection unit), a detection mode control unit 220 (an example of a detection resolution control unit), a gesture detection unit 230, and an operation control unit 240.

Based on the detection signal output from the proximity sensor 130, the person detection unit 210 detects an object (for example, a person (more specifically, the body of a person, a hand in the body, or the like)) present within the person detection range defined by the detection field of view FoV and the detection distance (see FIG. 3 and FIG. 4). For example, based on the detection signal output from the proximity sensor 130, the person detection unit 210 detects the object (for example, the body or the hand of the person) present in front of the electronic apparatus 1 with a predetermined sampling frequency (for example, 1 Hz). In the following, the fact that the person detection unit 210 detects the object (for example, the body or the hand of the person) may also be simply described as the fact that the person detection unit 210 detects the person or the hand. The person means the body of the person in general, which is at least part of the body including the hand when the person does not put his/her hand forward, or at least part of the body excluding the hand when the person is putting his/her hand forward. The fact that the person detection unit 210 detects the person or the hand includes both that the person detection unit 210 actually detects the person or the hand and that the person detection unit 210 detects an object other than the person or the hand.

As a method of improving the accuracy of detection to distinguish between an object other than the person and the person, such a condition that a shoulder part is detected more widely than the face in the detection state of the proximity sensor 130 where the person is detected as illustrated in states (B) and (C) of FIG. 4, i.e., that the detection distance of detection elements (squares 12 to 15) below detection elements (squares 5, 6, 9, 10) arranged near the center of the proximity sensor 130 is 65 cm and spread more widely in the horizontal direction than the detection elements (squares 5, 6, 9, 10) may be used. In other words, such a condition that a section below a section near the center of the proximity sensor 130 is detected more widely may also be added to the person detection conditions. Further, unlike an object, the person moves a little even when staying still, that is, the person shakes at least a little. Therefore, such a condition that shaking is detected from a change in detection distance may be added to the person detection conditions.

For example, when a person is detected from a state in which no person is detected within the person detection range, the person detection unit 210 detects that the person approaches the electronic apparatus 1 (Approach). Further, when a person is continuously being detected after the person is detected within the person detection range, the person detection unit 210 detects such a state that the person is present in front of the electronic apparatus 1 (Presence). Further, when a person is no longer detected from a state in which the person is being detected within the person detection range, the person detection unit 210 determines that the person present in front of the electronic apparatus 1 has left, and detects that the person has left the electronic apparatus 1 (Leave). Further, when an object is detected at a distance closer than a person in a state where the person is being detected within the person detection range, the person detection unit 210 detects that the person puts his/her hand forward (see state (C) of FIG. 3 and state (C) of FIG. 4, and FIG. 5). Note that when a person is detected within the person detection range and an object is detected at a distance closer than the person (for example, when a person and an object closer in distance than the person are detected at the same time), the person detection unit 210 may also detect that the person puts his/her hand forward. Further, when an object is detected at a distance closer by a fixed distance or more (for example, about 15 cm to 20 cm) than a person, the person detection unit 210 may detect that the person puts his/her hand forward.

The detection mode control unit 220 switches between detection modes based on the detection result of the person detection unit 210. For example, in the approach detection mode, when the person detection unit 210 detects the approach of a person to the electronic apparatus 1, the detection mode control unit 220 makes a transition to the leave detection mode. In the leave detection mode, when the person detection unit 210 detects that the person has left the electronic apparatus 1, the detection mode control unit 220 makes a transition from the leave detection mode to the approach detection mode.

Further, in the leave detection mode, when the person detection unit 210 detects that the person puts his/her hand forward, the detection mode control unit 220 makes a transition from the leave detection mode to the gesture detection mode. Upon transition to the gesture detection mode, the detection mode control unit 220 switches the detection resolution of the proximity sensor 130 from the default low-resolution mode to the high-resolution mode.

In the gesture detection mode, the gesture detection unit 230 detects a gesture according to the movement of the hand detected by the person detection unit 210 based on the detection signal output from the proximity sensor 130. For example, the gesture detection unit 230 compares the movement of the hand detected by the person detection unit 210 with a movement pattern of a preset gesture, and when determining that the movement of the hand matches the movement pattern of the gesture, the gesture detection unit 230 detects the movement of the hand as the gesture. Then, the gesture detection unit 230 transmits, to the system processing unit 300, a gesture ID for identifying the detected gesture. The gesture ID is associated uniquely with each of gestures preset as gesture input, respectively.

Figure 8:
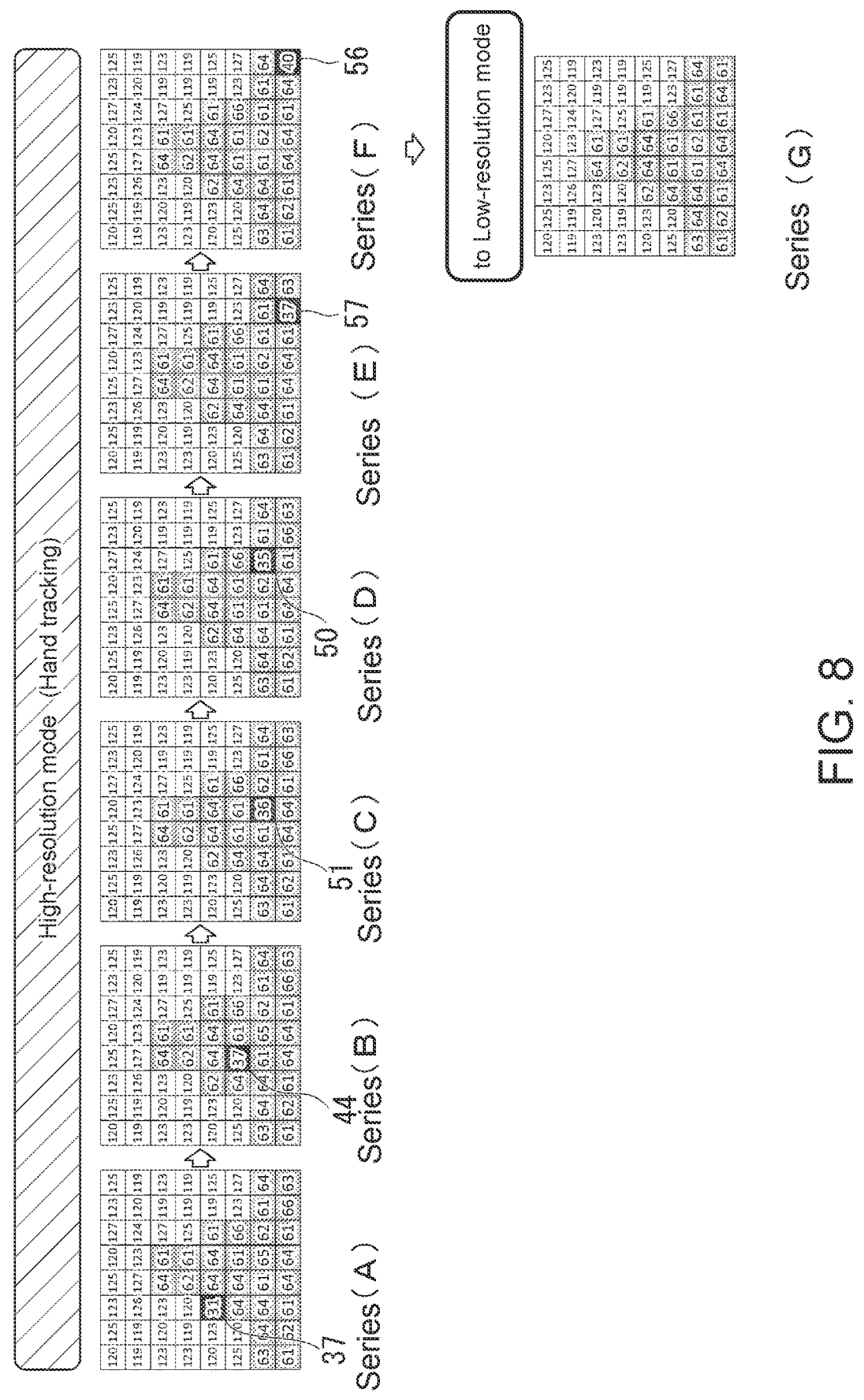

FIG. 8 is a schematic diagram illustrating an example of detection states of the proximity sensor 130 at the time of gesture detection. In FIG. 8, the example of the detection states when such a gesture that a person puts his/her hand forward and moves the hand from left to right is made in the gesture detection mode is illustrated. When it is detected in state (C) of FIG. 4 that the person puts his/her hand forward and the transition to the gesture detection mode is made, the resolution mode is switched from the low-resolution mode (see FIG. 2(A)) to the high-resolution mode (see FIG. 2(B)).

Series (A) of FIG. 8 illustrates a detection state when the resolution mode is switched to the high-resolution mode from the detection state illustrated in state (C) of FIG. 4. In FIG. 8, the number of each square in which the hand is detected among the 8×8 squares is indicated by using a leader line with reference to the number illustrated in FIG. 2(B). Further, each number in each of the 8×8 squares represents distance to the detected object (person or hand).

The gesture detection unit 230 tracks the detection position of the hand. Here, the hand is continuously being detected in time series from (A) to (F). Specifically, the square corresponding to a detection element detecting the hand is moved in time series from (A) to (F) in the order of 37→44→51→50→57→56. Thus, the fact that the hand moved from left to right in FIG. 8 can be detected. For example, when the detection condition of a left-to-right gesture is set as "within three squares above and below, and four squares or more from left to right," since the condition is met during a period from (A) to (D), the left-to-right gesture may be detected at the time of (D). Further, the detection condition of the left-to-right gesture is set as "within two squares above and below, and three squares or more from left to right," since the condition is met during a period from (C) to (F), the left-to-right gesture may be detected at the time of (F). Since the hand is no longer detected at (G), the gesture detection mode is ended, and the high-resolution mode is switched to the low-resolution mode.

In other words, the detection mode control unit 220 ends the gesture detection mode and makes the transition to the leave detection mode based on the fact that the hand is no longer detected from the state where the hand is being detected by the person detection unit 210 at the distance closer than the person (that is, the gesture detection mode). At this time, the detection mode control unit 220 further returns the detection resolution of the proximity sensor 130 from the high-resolution mode to the low-resolution mode. Note that the detection mode control unit 220 may also make the transition to the leave detection mode and return from the high-resolution mode to the low-resolution mode based on the fact that the gesture according to the movement of the hand is detected by the gesture detection unit 230. Thus, the detection mode control unit 220 sets the detection resolution of the proximity sensor 130 to the low-resolution mode when detecting a person present within the person detection range, and sets the detection resolution of the proximity sensor 130 to the high-resolution mode when detecting a gesture.

When a person is detected within the person detection range by the person detection unit 210, the operation control unit 240 boots the system to start the system processing by the system processing unit 300. Specifically, when the person detection unit 210 detects a person from the state where no person is detected within the person detection range (that is, when the approach of a person to the electronic apparatus 1 is detected), the operation control unit 240 boots the system to start the system processing. More specifically, when the system is booted to start the system processing by the system processing unit 300, the operation control unit 240 outputs a control signal to the power supply unit 400 to supply power necessary for the operation of each unit of the electronic apparatus 1. After that, the operation control unit 240 outputs a boot signal to the system processing unit 300 to instruct the system processing unit 300 to start the system processing. When acquiring the boot signal, the system processing unit 300 starts the system processing to make a transition to the normal operating state.

Further, when the person detection unit 210 is continuously detecting a person within the person detection range, the operation control unit 240 restricts the system processing by the system processing unit 300 not to make a transition to the standby state so as to continue the normal operating state. However, even when the person detection unit 210 is continuously detecting a person within the person detection range, the operation control unit 240 may make the transition from the normal operating state to the standby state depending on a predetermined condition (for example, when the duration of non-operation has lasted for a preset period of time).

Further, when the person detection unit 210 no longer detects the person from the state where the person detection unit 210 is detecting the person within the person detection range (that is, when the leave of the person from the electronic apparatus 1 is detected), the operation control unit 240 causes the system processing by the system processing unit 300 to make the transition from the normal operating state to the standby state. More specifically, the operation control unit 240 outputs a standby signal to the system processing unit 300 to instruct the system processing unit 300 to cause the system processing to make the transition from the normal operating state to the standby state. When acquiring the standby signal, the system processing unit 300 causes the system processing to make the transition from the normal operating state to the standby state. After that, the operation control unit 240 outputs a control signal to the power supply unit 400 to stop the supply of power unnecessary in the standby state.

The system processing unit 300 is configured to include a CPU 302, a GPU (Graphic Processing Unit) 304, a memory controller 306, an I/O (Input-Output) controller 308, a system memory 310, and an authentication processing unit 312, where processes of various application programs are executable on the OS by system processing based on the OS. The CPU 302 and the GPU 304 may be collectively called a processor. As described above, the transition can be made at least between the normal operating state (power-on state) and the standby state as operating states.

When the operating state of the system processing is the standby state and the boot signal is input from the EC 200, the CPU 302 makes a transition from the standby state to the normal operating state. For example, in the case where the operating state is the sleep state, when power is supplied from the power supply unit 400 and the boot signal is input from the EC 200, the CPU 302 starts boot processing. In the boot processing, the CPU 302 detects and initializes a minimal number of devices such as the system memory 310 and the storage unit 360 (pre-boot). The CPU 302 loads system firmware from the storage unit 360 into the system memory 310 to detect and initialize the other devices such as the communication unit 350 and the display unit 110 (post-processing). Initialization includes processing such as initial parameter settings. In a transition (resume) from the sleep state to the normal operating state, part of the post-processing may be omitted. After completion of the boot processing, the CPU 302 executes the system processing by the OS and executes processing of various application programs on the OS.

Further, when receiving a gesture ID from the EC 200, the CPU 302 passes the gesture ID to processing of the OS or an application program running on the OS. When receiving the gesture ID, the CPU 302 executes processing pre-associated with the gesture ID based on the processing of the OS or the application program. For example, when receiving a gesture ID corresponding to a gesture of moving a hand from up to down (or from down to up), the CPU 302 executes control to turn down or up the volume. Further, when receiving a gesture ID corresponding to a gesture of moving a hand from left to right (or from right to left) during execution of processing of a presentation application program, the CPU 302 executes control to turn or return a page.

Note that when the execution of the system processing by the OS is started, the CPU 302 executes login authentication processing before allowing access to the OS, and pauses the execution of the subsequent system processing until the login is allowed in the login authentication processing. The login authentication processing is user authentication processing to determine whether the person using the electronic apparatus 1 is a preregistered, authorized user or not. As the login authentication, there are password authentication, face authentication, fingerprint authentication, and the like. Here, description will be made by taking, as an example, face authentication processing. The CPU 302 instructs the authentication processing unit 312 to execute face authentication processing based on a face image of a person captured by the imaging unit 120. When the authentication result by the authentication processing unit 312 is successful, the CPU 302 allows the login and resumes the execution of the paused system processing. On the other hand, when the authentication result by the authentication processing unit 312 is unsuccessful, the CPU 302 does not allow the login and leaves the execution of the system processing paused.

The GPU 304 is connected to the display unit 110. The GPU 304 executes image processing under the control of the CPU 302 to generate display data. The GPU 304 outputs the generated display data to the display unit 110. Note that the CPU 302 and the GPU 304 may be integrally formed as one core, or the load may be shared between the CPU 302 and the GPU 304 formed as individual cores, respectively. The number of processors is not limited to one, and it may be plural.

The memory controller 306 controls reading data from and writing data to the system memory 310, the storage unit 360, and the like, by the CPU 302 and the GPU 304.

The I/O controller 308 controls input/output of data from the communication unit 350, the display unit 110, and the EC 200.

The system memory 310 is used as a reading area of an execution program of the processor and a working area to write processed data.

When receiving an instruction to execute the face authentication processing from the CPU 302, the authentication processing unit 312 executes the face authentication processing based on a face image of a person captured by the imaging unit 120. The face image of the person captured by the imaging unit 120 is the face image of a person who approaches from the front of the electronic apparatus 1. The face authentication processing includes face detection processing and face matching processing. The face detection processing is processing for defining a face area as the area of a face from an image signal input from the imaging unit 120. The face matching processing has a step of determining the positions of plural face feature points (for example, mouth, eyes, nose, etc.) representing the features of the face from the face area, normalizing the position and size of the face area to be predetermined position and size, respectively, and defining a distribution of the normalized face feature points as image feature values, and a step of matching the defined image feature values with image feature values of the face image of a predetermined person to identify the person having image feature values with which matching is successful. In the storage unit 360, authentication information is set for each account as an authorized user who logs in with the account. The authentication information includes image feature values of the face image of the user. The authentication information is stored in further association with user information indicative of the user. The user information may be any information, such as a user name or a user ID (Identifier), as long as the information can identify the user of the electronic apparatus 1.

When the result of matching the face image of the person captured by the imaging unit 120 with the authentication information on the set user can be determined to match each other, the authentication processing unit 312 determines that the face authentication is successful. On the other hand, for example, when a person other than the person using the electronic apparatus 1 cuts across in front of the electronic apparatus 1 by chance, the authentication processing unit 312 detects no face area from the image captured by the imaging unit 120. The authentication processing unit 312 outputs, to the CPU 302 and the EC 200, authentication information indicative of success/failure of the face authentication.

The communication unit 350 is connected to other devices communicably through a wireless or wired communication network to transmit and receive various data. For example, the communication unit 350 is configured to include a wired LAN interface such as the Ethernet (registered trademark), a wireless LAN interface such as Wi-Fi (registered trademark), and the like. Note that the communication unit 350 may also be configured to include a USB (Universal Serial Bus) interface and a Bluetooth (registered trademark) interface.

The storage unit 360 is configured to include storage media, such as an HDD (Hard Disk Drive), a secure NVRAM (Non-Volatile RAM), a ROM (Read Only Memory), and the like. The HDD stores the OS, device drivers, various programs such as applications, and various data acquired by the operation of the programs. In the secure NVRAM, authentication data used to authenticate each user is stored. In the authentication data, identification information of each user and authentication information are stored in association with each other. The secure NVRAM is protected (locked) not to be able to be accessed from an OS operating environment via the I/O controller 308. Note, however, that the lock is released upon power-on and reset of the CPU 302, and the system firmware is executed upon completion of the pre-boot to start the lock.

(Operation of Processing)

Figure 9:
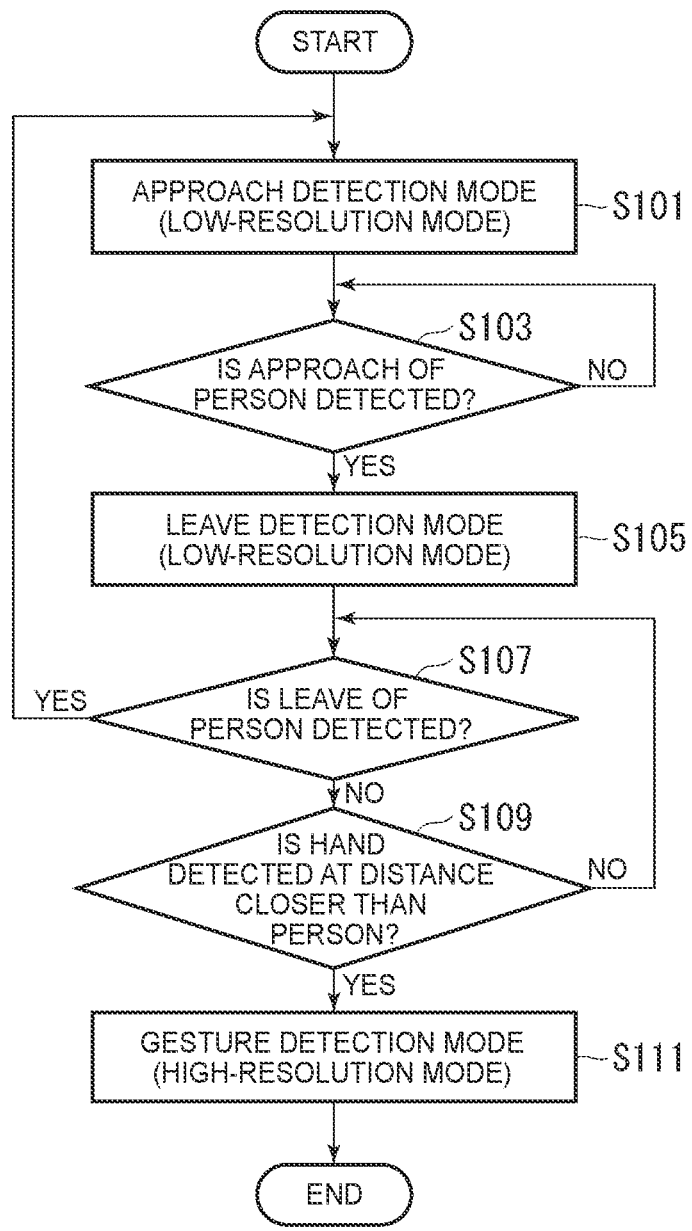
FIG. 9 is a flowchart illustrating an example of processing until transition to a gesture detection mode according to the first embodiment.

Next, the operation of processing related to gesture detection according to the present embodiment will be described. Referring first to FIG. 9, processing until transition to the gesture detection mode will be described. FIG. 9 is a flowchart illustrating an example of processing until transition to the gesture detection mode according to the present embodiment.

(Step S101) In the approach detection mode, the EC 200 sets the detection resolution of the proximity sensor 130 to the low-resolution mode to detect the approach of a person to the electronic apparatus 1. Then, the procedure proceeds to a process of step S103.

(Step S103) The EC 200 determines whether a person approaches the electronic apparatus 1 or not. When determining that no person approaches the electronic apparatus 1 (NO), the EC 200 executes the process of step S103 again. On the other hand, when determining that a person approaches the electronic apparatus 1 (YES), the EC 200 proceeds to a process of step S105.

(Step S105) The EC 200 makes a transition from the approach detection mode to the leave detection mode. In this leave detection mode, the detection resolution of the proximity sensor 130 remains in the low-resolution mode. Then, the EC 200 proceeds to a process of step S107.

(Step S107) In the leave detection mode, the EC 200 detects whether the person has left the electronic apparatus 1 or not. When determining that the person has left the electronic apparatus 1 (YES), the EC 200 returns to the process of step S101 to make the transition from the leave detection mode to the approach detection mode. On the other hand, when determining that the person does not leave the electronic apparatus 1 (NO), the EC 200 proceeds to a process of step S109.

(Step S109) In the leave detection mode, the EC 200 determines whether a hand is detected at a distance closer than the person or not. When determining that no hand is detected at a distance closer than the person (NO), the EC 200 returns to the process of step S107. On the other hand, when determining that a hand is detected at a distance closer than the person (YES), the EC 200 proceeds to a process of step S111.

(Step S111) The EC 200 makes a transition from the leave detection mode to the gesture detection mode. Further, the EC 200 switches the detection resolution of the proximity sensor 130 from the low-resolution mode to the high-resolution mode.

Figure 10:
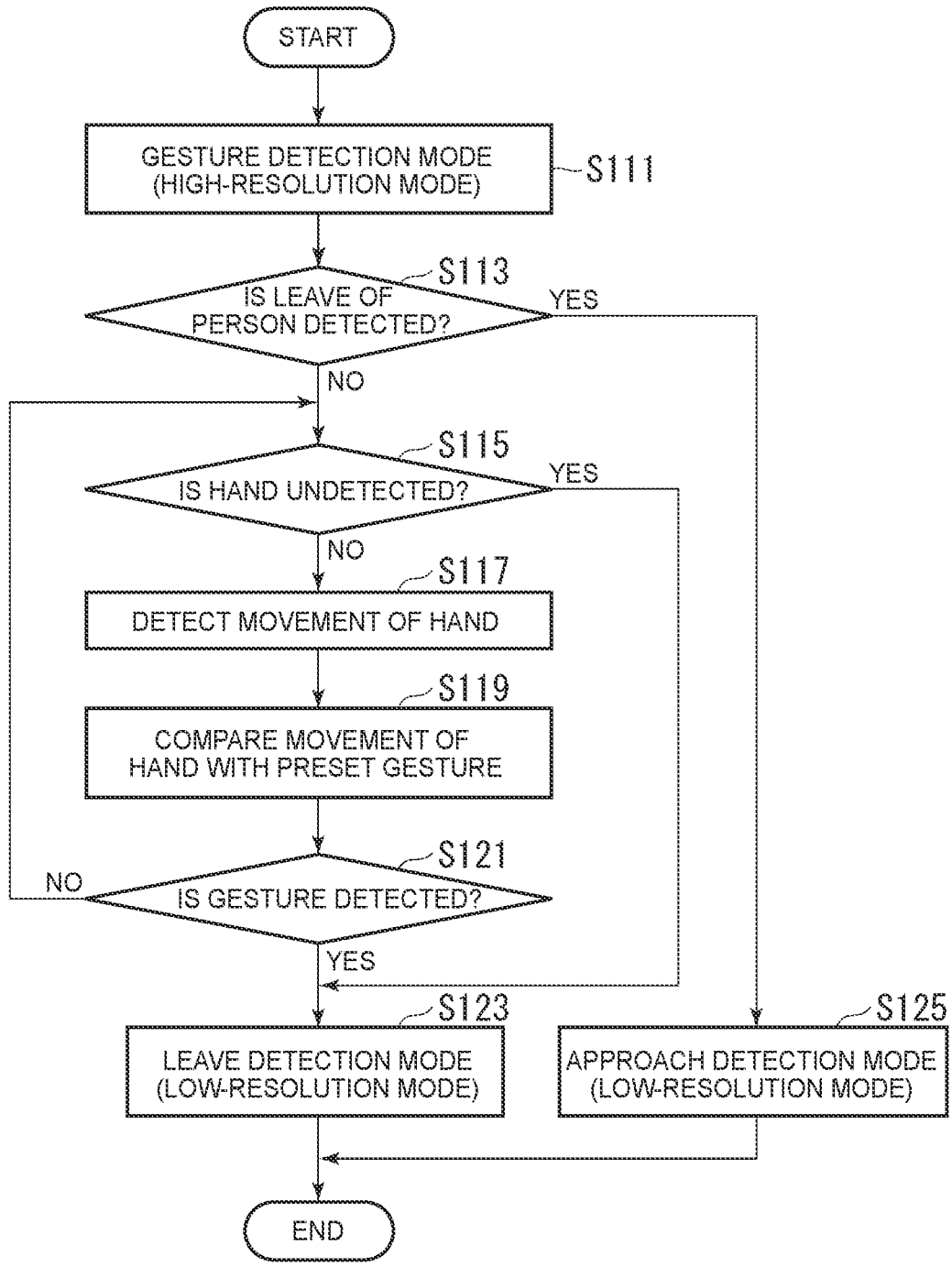
FIG. 10 is a flowchart illustrating an example of processing after transition to the gesture detection mode according to the first embodiment.

Referring next to FIG. 10, processing after transition to the gesture detection mode will be described. FIG. 10 is a flowchart illustrating an example of processing after transition to the gesture detection mode according to the present embodiment.

(Step S111) In the process of step S111 in FIG. 9, the EC 200 makes the transition to the gesture detection mode, and sets the detection resolution of the proximity sensor 130 to the high-resolution mode. Then, the EC 200 proceeds to a process of step S113.

(Step S113) In the gesture detection mode, the EC 200 detects whether the person has left the electronic apparatus 1 or not. When determining that the person has left the electronic apparatus 1 (YES), the EC 200 proceeds to a process of step S125 to make a transition from the gesture detection mode to the approach detection mode. Further, in response to the transition to the approach detection mode, the EC 200 switches the detection resolution of the proximity sensor 130 from the high-resolution mode to the low-resolution mode. On the other hand, when determining that the person does not leave the electronic apparatus 1 (NO), the EC 200 proceeds to a process of step S115.

(Step S115) In the gesture detection mode, the EC 200 determines whether or not the hand is no longer detected. When determining that the hand is no longer detected (YES), the EC 200 proceeds to a process of step S123 to end the gesture detection mode and make a transition to the leave detection mode. Further, in response to the transition to the leave detection mode, the EC 200 switches the detection resolution of the proximity sensor 130 from the high-resolution mode to the low-resolution mode. On the other hand, when determining that the hand is being detected (NO), the EC 200 proceeds to a process of step S117.

(Step S117) The EC 200 tracks the detection position of the hand to detect the movement of the hand. Then, the EC 200 proceeds to a process of step S119.

(Step S119) The EC 200 compares the detected movement of the hand with a movement pattern of a preset gesture. Then, the EC 200 proceeds to a process of step S121.

(Step S121) The EC 200 determines whether or not a gesture is detected based on the comparison result in step S119. For example, when determining in step S119 that the detected movement of the hand matches the movement pattern by the gesture, the EC 200 detects the movement of the hand as the gesture. On the other hand, when determining in step S119 that the movement of the hand does not match the movement pattern by the gesture, the EC 200 does not detect the movement of the hand as the gesture. When the gesture is not detected (NO), the EC 200 returns to the process of step S115 to continue the gesture detection mode. On the other hand, when the gesture is detected (YES), the EC 200 proceeds to a process of step S123 to end the gesture detection mode and make a transition to the leave detection mode. Further, in response to the transition to the leave detection mode, the EC 200 switches the detection resolution of the proximity sensor 130 from the high-resolution mode to the low-resolution mode.

Figure 11:
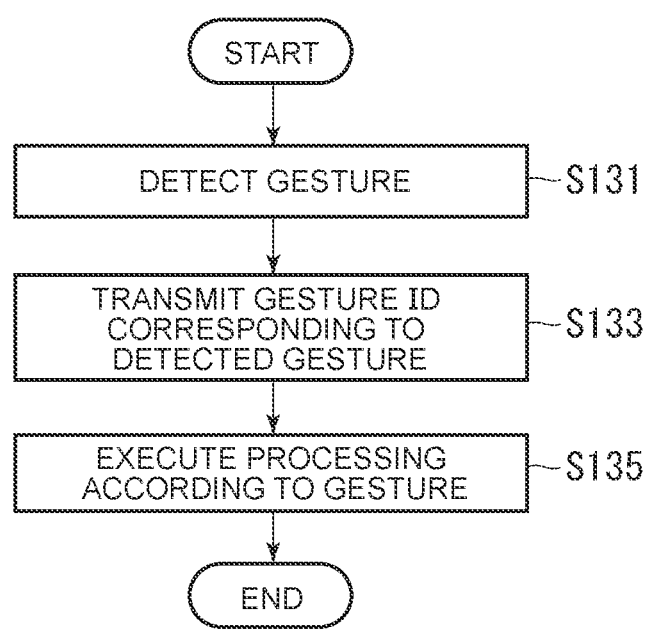
FIG. 11 is a flowchart illustrating an example of processing after a gesture is detected according to the first embodiment.

Referring next to FIG. 11, processing for giving a notification to the system processing unit 330 after the EC 200 detects the gesture will be described. FIG. 11 is a flowchart illustrating an example of processing after the gesture is detected according to the present embodiment.

(Step S131) When detecting the gesture (step S121 in FIG. 10: YES), the EC 200 proceeds to a process of step S133.

(Step S133) The EC 200 acquires a gesture ID corresponding to the detected gesture, and transmits the gesture ID to the system processing unit 300. Then, the procedure proceeds to a process of step S135.

(Step S135) When receiving the gesture ID from the EC 200, the system processing unit 300 passes the gesture ID to processing by the OS or an application program running on the OS to execute processing pre-associated with the gesture ID by the processing of the OS or the application program.

As described above, the electronic apparatus 1 according to the present embodiment includes the proximity sensor 130 which detects infrared light (an example of a wave motion) coming from a person (one example of an object) present within the person detection range (an example of a predetermined range) and outputs a detection signal. The electronic apparatus 1 detects a person present within the person detection range based on the detection signal output from the proximity sensor 130. Further, the electronic apparatus 1 detects a gesture according to the movement of a hand (the other example of the object) based on the detection signal output from the proximity sensor 130. Then, the electronic apparatus 1 sets the detection resolution of the proximity sensor 130 to the low-resolution mode (an example of a first resolution) when detecting a person (the one example of the object) present within the person detection range, and sets the detection resolution of the proximity sensor 130 to the high-resolution mode (an example of a second resolution) when detecting a gesture.

Thus, since the electronic apparatus 1 sets the detection resolution of the proximity sensor 130 to the low resolution mode when detecting a person and sets the detection resolution of the proximity sensor 130 to the high-resolution mode only when detecting a gesture, the detection of a gesture is made possible in addition to the detection of a person while suppressing power consumption.

For example, when a person (the body of a person; an example of a first object) is detected within the person detection range and a hand (an example of a second object) is detected at a distance closer than the person, the electronic apparatus 1 changes from the low-resolution mode to the high-resolution mode.

Thus, since the detection resolution of the proximity sensor 130 is switched to the high-resolution mode when a person using the electronic apparatus 1 starts a gesture, the electronic apparatus 1 can improve the detection accuracy of the gesture.

As an example, when a hand (the example of the second object) is detected at a distance closer than a person (the body of a person; the example of the first object) in such a state that the person is being detected within the person detection range (that is, in the leave detection mode), the electronic apparatus 1 changes from the low-resolution mode to the high-resolution mode.

Thus, since the detection resolution of the proximity sensor 130 is changed to the high-resolution mode when the person using the electronic apparatus 1 starts a gesture, the electronic apparatus 1 can improve the detection accuracy of the gesture.

Further, the electronic apparatus 1 returns from the high-resolution mode to the low-resolution mode based on the fact that the hand (the example of the second object) is no longer detected from the state where the hand is being detected at the distance closer than the person (the body of the person; the example of the first object).

Thus, since the low-resolution mode is set while the person is not performing any gesture, the electronic apparatus 1 can suppress power consumption.

Further, the electronic apparatus 1 may detect a gesture according to the movement of the hand (the example of the second object) and return from the high-resolution mode to the low-resolution mode based on the fact that the gesture according to the movement of the hand is detected.

Thus, since the low-resolution mode is set after the person performs the gesture, the electronic apparatus 1 can suppress power consumption.

Further, when the hand (the example of the second object) is detected at a distance closer by a fixed distance or more (for example, about 15 cm to 20 cm) than the person (the body of the person; the example of the first object), the electronic apparatus 1 may change from the low-resolution mode to the high-resolution mode.

Thus, for example, the electronic apparatus 1 can prevent a shoulder of the person is misidentified as a hand when the shoulder of the person goes forward a little.

Note that when the hand (the example of the second object) of the person (the body of the person; the example of the first object) is detected in the state where the person is not detected within the person detection range, the electronic apparatus 1 may change from the low-resolution mode to the high-resolution mode. For example, it is considered that, even when the person is present in the neighborhood of the electronic apparatus 1 (for example, at a side of the electronic apparatus 1) outside of the person detection range, the person may perform a gesture by putting only his/her hand out in front of the electronic apparatus 1. In this case, since the object present within the person detection range is only the hand and the body of the person is not present, the hand cannot be detected on condition that the hand is at a distance closer than the person. Therefore, when any object is detected from a state where a person (the body of a person; the example of the first object) is not detected within the person detection range, the electronic apparatus 1 may determine whether the object is a person (the body of a person; the example of the first object) or a hand (the example of the second object) from the size of the object. For example, when the size of the detected object is a preset threshold value (for example, four squares) or more in FIG. 4 illustrating the detection states of the proximity sensor 130, the electronic apparatus 1 may determine the object to be a person (the body of a person; the example of the first object), while when the size is less than the preset threshold value, the electronic apparatus 1 may determine the object to be a hand (the example of the second object). Then, when determining that the object is the hand (the example of the second object), the electronic apparatus 1 may change from the low-resolution mode to the high-resolution mode.

Second Embodiment

Next, a second embodiment of the present invention will be described.

In the first embodiment, as illustrated in FIG. 3, when the approach of a person is detected in the approach detection mode, the transition to the leave detection mode is made while keeping the low-resolution mode. However, when the approach of a person is detected in the approach detection mode, the resolution mode may be once switched to the high-resolution mode to make the transition to the gesture detection mode. In this case, when a hand is not detected at a distance closer than the person for a predetermined time, the resolution mode may be switched to the low-resolution mode to make the transition to the leave detection mode.

Figure 12:
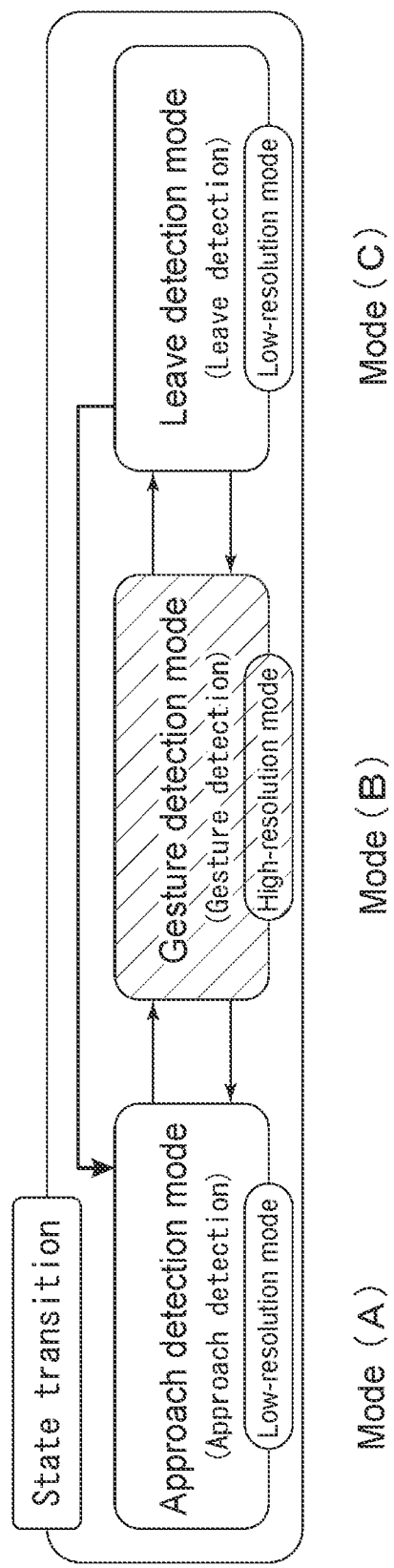
FIG. 12 is a diagram illustrating state transitions between detection modes according to a second embodiment.

FIG. 12 is a diagram illustrating state transitions between detection modes according to the second embodiment. The state transitions between detection modes illustrated in FIG. 12 are different from the state transitions between detection modes illustrated in FIG. 3 in that the transition to the leave detection mode is first made in FIG. 3 when the approach of a person is detected in the approach detection mode, whereas the transition to the gesture detection mode is first made in FIG. 12 when the approach of a person is detected in the approach detection mode.

In the approach detection mode of (A), when a person is detected by the person detection unit 210 from a state where no person is detected within the person detection range, the detection mode control unit 220 makes a transition to the gesture detection mode of (B), and switches from the low-resolution mode to high-resolution mode. Then, when a hand is detected at a distance closer than the person within a predetermined period after the change to the high-resolution mode, the detection mode control unit 220 continues the setting of the high-resolution mode to detect a gesture. On the other hand, when no hand is detected at the distance closer than the person within the predetermined period, the detection mode control unit 220 makes a transition from the gesture detection mode to the leave detection mode of (C), and returns from the high-resolution mode to the low-resolution mode.

In the leave detection mode of (C), when a hand is detected by the person detection unit 210 at a distance closer than the person, the detection mode control unit 220 makes a transition to the gesture detection mode of (B) and switches from the low-resolution mode to the high-resolution mode. Further, in the leave detection mode of (C), when the person is no longer detected by the person detection unit 210 within the person detection range, the detection mode control unit 220 makes a transition to the approach detection mode of (A). Further, in the gesture detection mode of (B), when both the person and the hand are no longer detected by the person detection unit 210, the detection mode control unit 220 makes a transition to the approach detection mode of (A) and returns from the high-resolution mode to the low-resolution mode.

As described above, when a person (the body of a person; the example of the first object) is detected within the person detection range from a state where no person is detected, the electronic apparatus 1 changes from the low-resolution mode to the high-resolution mode. Then, when a hand (the example of the second object) is detected at a distance closer than the person within the predetermined period after the change to the high-resolution mode, the electronic apparatus 1 continues the setting of the high-resolution mode. On the other hand, when no hand is detected at a distance closer than the person within the predetermined period, the electronic apparatus 1 returns from the high-resolution mode to the low-resolution mode.

Thus, since the detection resolution of the proximity sensor 130 is switched to the high-resolution mode when the person using the electronic apparatus 1 starts a gesture, the electronic apparatus 1 can improve the detection accuracy of the gesture. For example, even when the person starts a gesture at the same time as approaching the electronic apparatus 1, since the gesture can be detected in the high-resolution mode, the electronic apparatus 1 can improve the detection accuracy of the gesture.

Third Embodiment

Next, a third embodiment of the present invention will be described. Detection mode transition processing accompanied with the HPD processing and the gesture detection processing in this embodiment is the same as that in the first embodiment or the second embodiment. Here, one form related to control of the detection range of the proximity sensor 130 will be described. Note that the external structure of the electronic apparatus 1 is the same as the structure illustrated in FIG. 6.

The detection field of view FoV of the proximity sensor 130 varies with the open angle θ of the electronic apparatus 1 (see FIG. 6). Therefore, for example, when the open angle θ becomes smaller (that is, when the first chassis 10 stands up) in the leave detection mode as illustrated in state (B) of FIG. 3, it is considered that a hand operating the keyboard 151 or the like may enter the detection field of view FoV. In this case, when the hand operating the keyboard 151 or the like enters the person detection range and is determined to be at a distance closer than a person, the detection resolution of the proximity sensor 130 is switched to the high-resolution mode even though the person has no intention to perform any gesture, resulting in unnecessarily increasing power consumption. Therefore, the electronic apparatus 1 may exclude a partial range in the person detection range from the detection target according to the open angle θ. Specifically, when the open angle θ becomes less than a predetermined threshold value, a certain lower range of the person detection range (on the side of the second chassis 20) may be excluded from the detection target. The certain range to be excluded from the detection target is preset based on the open angle θ and the positional relationship with the keyboard 151 or the like provided on the second chassis 20. The range to be excluded from the detection target may also vary with changes in open angle θ.

Figure 13:
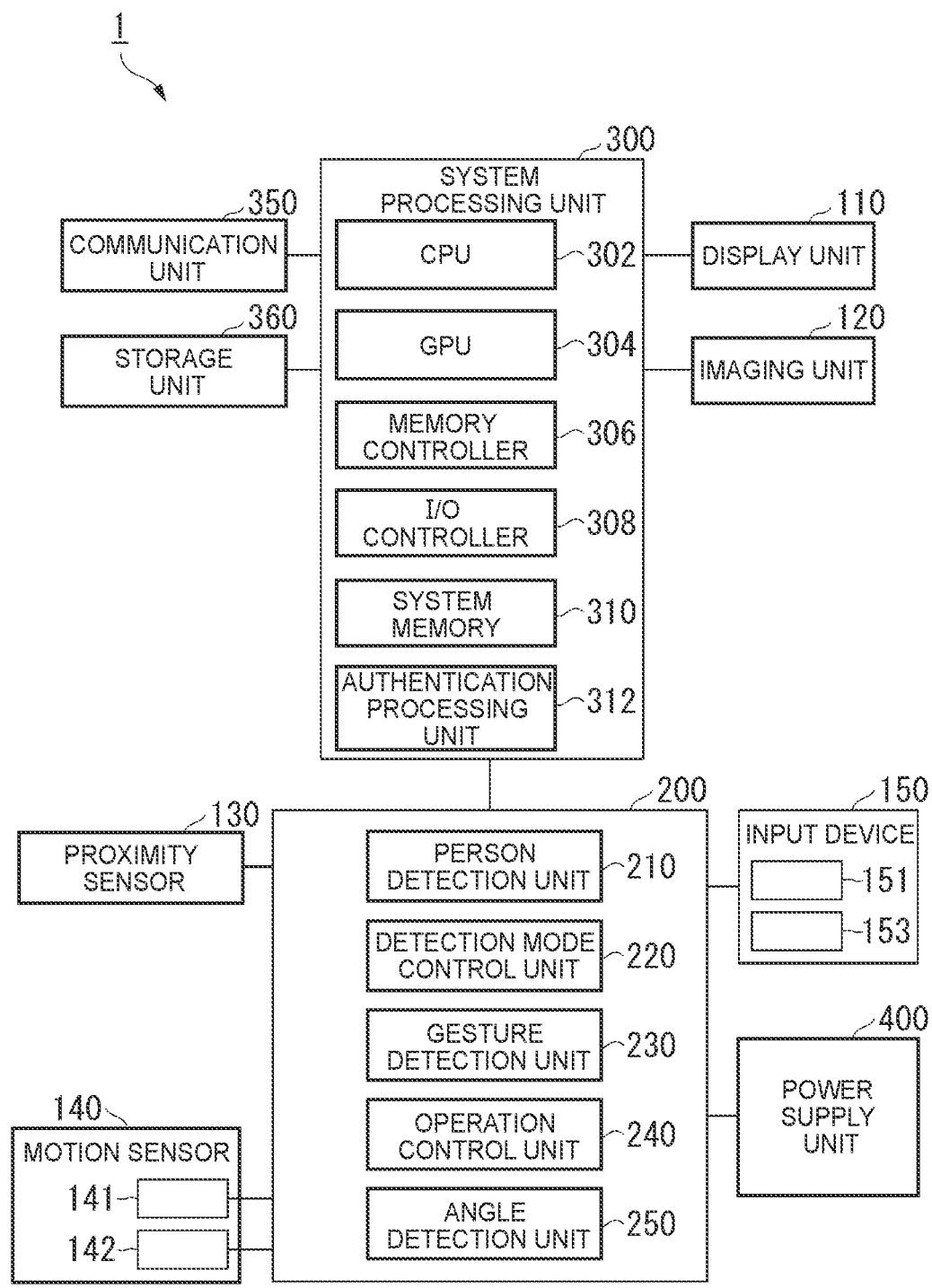
FIG. 13 is a schematic block diagram illustrating an example of the configuration of the electronic apparatus according to a third embodiment.

FIG. 13 is a schematic block diagram illustrating an example of the configuration of the electronic apparatus 1 according to the present embodiment. In FIG. 13, the same numeral is given to each component corresponding to each unit illustrated in FIG. 7 to omit the description thereof. The configuration illustrated in FIG. 13 is different from the configuration illustrated in FIG. 7 in that a motion sensor 140 and an angle detection unit 250 are included.

The motion sensor 140 is configured to include an acceleration sensor 141 provided in the first chassis 10 and an acceleration sensor 142 provided in the second chassis 20. The acceleration sensor 141 outputs a detection signal according to the amount of physical motion, the direction of the motion, and the tilt of the first chassis 10. The acceleration sensor 142 outputs a detection signal according to the amount of physical motion, the direction of the motion, and the tilt of the second chassis 20. Note that the motion sensor 140 may also be configured to include gyro sensors, tilt sensors, geomagnetic sensors, or the like instead of or in addition to the acceleration sensors.

The angle detection unit 250 acquires the detection signals output from the motion sensor 140, and detects the open angle θ between the first chassis 10 and the second chassis 20 based on the acquired detection signals. Further, based on the detected open angle θ, the angle detection unit 250 determines whether the first chassis 10 and the second chassis 20 are in the open state or the closed state. The angle detection unit 250 may also detect the respective postures of the first chassis 10 and the second chassis 20 (for example, respective angles with respect to the direction of gravity) based on the detection signals acquired from the motion sensor 140. When the open angle θ detected by the angle detection unit 250 is less than a predetermined value, the person detection unit 210 excludes a partial range in the person detection range from the detection target.

Thus, according to the open angle θ of the electronic apparatus 1 in use, the electronic apparatus 1 can prevent erroneous detection of a hand operating the keyboard 151 or the like as the hand performing a gesture. Therefore, the electronic apparatus 1 can suppress unnecessarily increased power consumption due to the erroneous detection.

While the embodiments of this invention have been described in detail above with reference to the accompanying drawings, the specific configurations are not limited to the above-described embodiments, and design changes are included without departing from the scope of this invention. The respective components described in the above-described embodiments can be combined arbitrarily.

In the above description, the case where the proximity sensor 130 is mainly an infrared sensor module is taken as an example, but the present invention is not limited thereto. The proximity sensor 130 has only to include plural detection elements capable of detecting a wave motion coming from a person in a non-contact manner. The wave motion coming from an object such as a person includes reflected waves reflected on the object and a wave motion emitted from the object itself. In addition to the infrared light and visible light, the waves may be radio waves shorter in wavelength than the infrared light. The proximity sensor 130 may also be, for example, a radar sensor module. For example, when the proximity sensor 130 detects radio waves, an object such as a person may be detected based on the intensity of radio waves received at a receiving antenna, or the object such as the person may be detected based on a difference in reception time when radio waves transmitted from a transmitting antenna are received two or more receiving antennas. In this case, the detectable range of the proximity sensor 130 corresponds to a receivable range of the receiving antennas.

Further, in the standby state described above, a hibernation state, a power-off state, or the like may also be included. The hibernation state corresponds, for example, to S4 state defined in the ACPI specification. The power-off state corresponds, for example, to S5 state (shutdown state) defined in the ACPI specification. Further, in the standby state, a state in which at least the display of the display unit is turned OFF (screen OFF) or a screen lock state may also be included. The screen lock is a state in which an image preset to make a content being processed invisible (for example, an image for the screen lock) is displayed on the display unit, which is an unused state until the lock is released (for example, until the user is authenticated).

Further, in the above embodiments, the EC 200 operating independently of the system processing unit 300 may be any processing unit such as a sensor hub or a chipset, and the above-described processing may be executed by any processing unit other than the EC 200 instead of the EC 200. It is usually the case that the sum of power consumption of the processing unit such as this EC 200 and the proximity sensor 130 is significantly lower than the power consumption of the system processing unit 300.

Note that the electronic apparatus 1 described above has a computer system therein. Then, a program for implementing the function of each component included in the electronic apparatus 1 described above may be recorded on a computer-readable recording medium so that the program recorded on this recording medium is read into the computer system and executed to perform processing in each component included in the electronic apparatus 1 described above. Here, the fact that "the program recorded on the recording medium is read into the computer system and executed" includes installing the program on the computer system. It is assumed that the "computer system" here includes the OS and hardware such as peripheral devices and the like. Further, the "computer system" may also include two or more computers connected through networks including the Internet, WAN, LAN, and a communication line such as a dedicated line. Further, the "computer-readable recording medium" means a storage medium such as a flexible disk, a magneto-optical disk, a ROM, a portable medium like a CD-ROM, or a hard disk incorporated in the computer system. The recording medium with the program stored thereon may be a non-transitory recording medium such as the CD-ROM.

Further, a recording medium internally or externally provided to be accessible from a delivery server for delivering the program is included as the recording medium. Note that the program may be divided into plural pieces, downloaded at different timings, respectively, and then united in each component included in the electronic apparatus 1, or delivery servers for delivering respective divided pieces of the program may be different from one another. Further, the "computer-readable recording medium" includes a medium on which the program is held for a given length of time, such as a volatile memory (RAM) inside a computer system as a server or a client when the program is transmitted through a network. The above-mentioned program may also be to implement some of the functions described above. Further, the program may be a so-called differential file (differential program) capable of implementing the above-described functions in combination with a program(s) already recorded in the computer system.

Further, some or all of the functions of the electronic apparatus 1 in the above-described embodiments may be realized as an integrated circuit such as LSI (Large Scale Integration). Each function may be implemented by a processor individually, or some or all of the functions may be integrated as a processor. Further, the method of circuit integration is not limited to LSI, and it may be realized by a dedicated circuit or a general-purpose processor. Further, if integrated circuit technology replacing the LSI appears with the progress of semiconductor technology, an integrated circuit according to the technology may be used.

Further, the electronic apparatus 1 of the aforementioned embodiments is not limited to a PC, a tablet terminal, a smartphone, or the like, and the present invention can also be applied to a household electric appliance or a commercial electric appliance. As the household electric appliance, one or more embodiments of the present invention can be applied to a TV set, a refrigerator or a microwave oven having a display unit, or the like. For example, one or more embodiments of the present invention can be applied to control ON/OFF (normal operating state/standby state) of a TV screen or ON/OFF (normal operating state/standby state) of a screen of the display unit of the refrigerator or the microwave oven in response to the approach or leave of a person, and applied to gesture input to the TV set, the refrigerator, or the microwave oven. As the commercial electric appliance, one or more embodiments of the present invention can be applied to a vending machine, a multimedia station, or the like in the same manner.

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

DESCRIPTION OF SYMBOLS 1 electronic apparatus, 10 first chassis, 20 second chassis, 15 hinge mechanism, 110 display unit, 120 imaging unit, 130 proximity sensor, 140 motion sensor, 141, 142 acceleration sensor, 150 input device, 151 keyboard, 153 touch pad, 200 EC, 210 person detection unit, 220 detection mode control unit, 230 gesture detection unit, 240 operation control unit, 250 angle detection unit, 300 system processing unit, 302 CPU, 304 GPU, 306 memory controller, 308 I/O controller, 310 system memory, 312 authentication processing unit, 350 communication unit, 360 storage unit, 400 power supply unit

The invention claimed is:

1. An electronic apparatus comprising:
a detection sensor which detects a wave motion coming from an object present within a predetermined range and outputs a detection signal;
an object detection unit which detects an object present within the predetermined range based on the detection signal output from the detection sensor;
a gesture detection unit which detects a gesture according to movement of the object based on the detection signal output from the detection sensor; and
a detection mode control unit that switches between an approach detection mode, a leave detection mode, and a gesture detection mode based on a detection result of the object detection unit, wherein
the detection mode control unit sets a detection resolution of the detection sensor to a first resolution during the approach detection mode and the leave detection mode, and sets the detection resolution of the detection sensor to a second resolution equal in field of view to the first resolution and higher in resolution than the first resolution during the gesture detection mode, and
the detection mode control unit switches to the gesture detection mode upon the object detection unit simultaneously detecting, during the approach detection mode or the leave detection mode, both a first object within the predetermined range and a second object at a distance closer than the first object.

2. The electronic apparatus according to claim 1, wherein when the second object is further detected at a distance closer than the first object in a state where the first object is being detected within the predetermined range by the object detection unit, the detection mode control unit changes the detection resolution from the first resolution to the second resolution.

3. The electronic apparatus according to claim 1, wherein the detection mode control unit changes the detection resolution from the first resolution to the second resolution when a first object is detected from a state where the first object is not detected within the predetermined range by the object detection unit, and after the change, continues setting of the second resolution when a second object is detected at a distance closer than the first object within a predetermined period, or returns from the second resolution to the first resolution when the second object is not detected at the distance closer than the first object within the predetermined period.

4. The electronic apparatus according to claim 1, wherein the detection mode control unit returns the detection resolution from the second resolution to the first resolution based on a fact that the second object is no longer detected from a state where the second object is being detected at the distance closer than the first object by the object detection unit.

5. The electronic apparatus according to claim 1, wherein
the gesture detection unit detects a gesture according to movement of the second object, and
the detection mode control unit returns the detection resolution from the second resolution to the first resolution based on a fact that the gesture according to the movement of the second object is detected by the gesture detection unit.

6. The electronic apparatus according to claim 1, wherein the detection mode control unit changes the detection resolution from the first resolution to the second resolution when the second object is detected at a distance closer by a fixed distance or more than the first object.

7. An electronic apparatus, comprising:
a detection sensor which detects a wave motion coming from an object present within a predetermined range and outputs a detection signal;
an object detection unit which detects an object present within the predetermined range based on the detection signal output from the detection sensor;
a gesture detection unit which detects a gesture according to movement of the object based on the detection signal output from the detection sensor;
a detection resolution control unit which sets a detection resolution of the detection sensor to a first resolution when detecting the object present within the predetermined range, and sets the detection resolution of the detection sensor to a second resolution higher in resolution than the first resolution when detecting the gesture;
a first chassis with the detection sensor provided therein;
a second chassis connected to the first chassis in a manner to be rotatable relative to the first chassis, and on which an operation unit for accepting user's operations is provided; and
an angle detection unit which detects an open angle between the first chassis and the second chassis,
wherein when the open angle detected by the angle detection unit is less than a predetermined value, the object detection unit excludes a partial range in the predetermined range from a detection target.

8. A control method for an electronic apparatus including a detection sensor which detects a wave motion coming from an object present within a predetermined range and outputs a detection signal, the control method comprising:
   a step of causing an object detection unit to detect an object present within the predetermined range based on the detection signal output from the detection sensor;
   a step of causing a gesture detection unit to detect a gesture according to movement of the object based on the detection signal output from the detection sensor; and
   a step of causing a detection mode control unit to switch between an approach detection mode, a leave detection mode, and a gesture detection mode based on a detection result of the object detection unit;
   a step of causing the detection mode control unit to set a detection resolution of the detection sensor to a first resolution during the approach detection mode and the leave detection mode, and set the detection resolution of the detection sensor to a second resolution equal in field of view to the first resolution and higher in resolution than the first resolution during the gesture detection mode; and
   a step of causing the detection mode control unit to switch to the gesture detection mode upon the objection detection unit simultaneously detecting, during the approach detection mode or the leave detection mode, both a first object within the predetermined range and a second object at a distance closer than the first object.

9. A computing device comprising:
   a detection sensor that detects a wave motion coming from an object present within a predetermined range and outputs a detection signal; and
   at least one processor that is coupled to the detection sensor and that:
      switches between an approach detection mode, a leave detection mode, and a gesture detection mode based on the detection signal output from the detection sensor;
      sets a detection resolution of the detection sensor to a first resolution during the approach detection mode and the leave detection mode, and sets the detection resolution of the detection sensor to a second resolution equal in field of view to the first resolution and higher in resolution than the first resolution when detecting the gesture; and
      upon detecting, during the approach detection mode or the leave detection mode, a first object within the predetermined range and a second object at a distance closer than the first object, switches to the gesture detection mode, wherein
         during the approach detection mode, the at least one processor detects an object entering the predetermined range,
         during the leave detection mode, the at least one processor detects an object leaving the predetermined range, and
         during the gesture detection mode, the at least one processor detects a gesture according to movement of an object within the predetermined range.

* * * * *